(12) United States Patent
Naganawa

(10) Patent No.: US 9,037,981 B2
(45) Date of Patent: May 19, 2015

(54) INFORMATION PROCESSING APPARATUS, CONTROL METHOD THEREFOR, AND STORAGE MEDIUM FOR DISPLAYING CURSORS FROM OTHER SITES IN DEDICATED WINDOWS

(75) Inventor: Yoshihiro Naganawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 13/154,104

(22) Filed: Jun. 6, 2011

(65) Prior Publication Data

US 2011/0320962 A1    Dec. 29, 2011

(30) Foreign Application Priority Data

Jun. 28, 2010   (JP) .................. 2010-146890

(51) Int. Cl.
*G06F 3/0481*   (2013.01)

(52) U.S. Cl.
CPC .......... *G06F 3/04812* (2013.01); *G06F 3/0481* (2013.01)

(58) Field of Classification Search
None
See application file for complete search history.

(56) References Cited

U.S. PATENT DOCUMENTS

| | | | | |
|---|---|---|---|---|
| 6,219,028 | B1* | 4/2001 | Simonson | 715/862 |
| 6,219,208 | B1* | 4/2001 | Gill | 360/324.1 |
| 7,620,900 | B2* | 11/2009 | Kawashima et al. | 715/754 |
| 7,696,979 | B1* | 4/2010 | Skergan | 345/157 |
| 7,712,041 | B2* | 5/2010 | Toyama et al. | 715/778 |
| 8,191,003 | B2* | 5/2012 | Brown et al. | 715/769 |
| 8,217,854 | B2* | 7/2012 | Bhogal et al. | 345/1.1 |
| 8,296,662 | B2* | 10/2012 | Amano | 715/754 |
| 2006/0271875 | A1* | 11/2006 | Green et al. | 715/768 |
| 2007/0100937 | A1* | 5/2007 | Burtner et al. | 709/204 |
| 2007/0288640 | A1* | 12/2007 | Schmieder | 709/227 |
| 2008/0225007 | A1* | 9/2008 | Nakadaira et al. | 345/173 |
| 2008/0244461 | A1* | 10/2008 | Kropivny | 715/856 |
| 2010/0180210 | A1* | 7/2010 | Toyama et al. | 715/750 |
| 2010/0325572 | A1* | 12/2010 | Morris et al. | 715/773 |
| 2011/0252335 | A1* | 10/2011 | Lloyd et al. | 715/744 |

FOREIGN PATENT DOCUMENTS

| | | |
|---|---|---|
| JP | 7-230357 A | 8/1995 |
| JP | 08-36546 A | 2/1996 |

OTHER PUBLICATIONS

VNC, http://www.cl.cam.ac.uk/research/dtg/attarchive/vnc/.
WebEx, http://www.webex.co.jp/.

* cited by examiner

*Primary Examiner* — William Bashore
*Assistant Examiner* — Hien Duong
(74) *Attorney, Agent, or Firm* — Fitzpatrick, Cella, Harper & Scinto

(57) ABSTRACT

Display of a pointer on the display screen of a display output apparatus is controlled in accordance with first pointing information obtained from an input apparatus. Second pointing information obtained from an input apparatus of an information processing apparatus at another site connected via a network is received from the information processing apparatus at the other site. Control is performed on display of the received second pointing information regarding the display screen of the display output apparatus. A dedicated window for displaying the second pointing information is displayed in the foreground with respect to other windows displayed on the display screen.

8 Claims, 8 Drawing Sheets

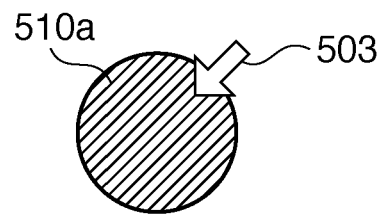
F I G. 8A
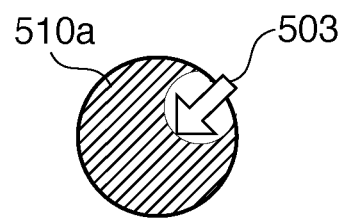
F I G. 8B
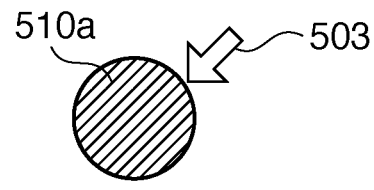
F I G. 8C
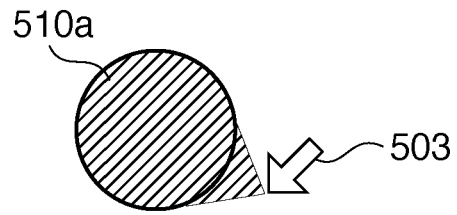
F I G. 8D

INFORMATION PROCESSING APPARATUS, CONTROL METHOD THEREFOR, AND STORAGE MEDIUM FOR DISPLAYING CURSORS FROM OTHER SITES IN DEDICATED WINDOWS

BACKGROUND OF THE INVENTION

1. Field of the Invention

The present invention relates to an information processing apparatus that is connected to multiple information processing apparatuses via a network and includes an input apparatus inputs pointing information and a display output apparatus.

2. Description of the Related Art

There are screen sharing techniques and application software in which arbitrary points on the screen of a given terminal (a home site) can be pointed to from external sites, and such points pointed to at multiple sites can be shared on a single screen of the terminal. One typical example is software such as VNC in which the screen of a home site can be operated from other sites. By performing operations on the home site from other sites in this way, a pointer of the home site performs a pointing function, and pointing operations by the pointer can be viewed simultaneously both at the home site on which the operations are being performed and at the other sites from which the operations are being performed (http://www.cl.cam.ac.uk/research/dtg/attarchive/vnc/).

As another example, in a conference system such as WebEx, a screen on which exactly the same display content can be viewed from each site is shared between sites, and when a pointing operation is performed on that screen, it can be seen which site has performed the pointing operation. In such cases, because the conditions in which pointing operations have been performed are also shared, pointing operations from other sites can be viewed at the home site (WebEx: http://www.webex.co.jp/).

Furthermore, an input pointer display method and apparatus are known as a technique for controlling a pointer (Japanese Patent Laid-Open No. 7-230357). The technique disclosed in Japanese Patent Laid-Open No. 7-230357 is such that in the case where a pointer of the home site is positioned close to an operation target, the pointer is hidden in order to facilitate viewing of the operation target.

However, the techniques described in the above related art have the following problems.

In the case of a VNC mechanism (http://www.cl.cam.ac.uk/research/dtg/attarchive/vnc/), there are a limited number of points that can be pointed to simultaneously. In this case, pointing operations are performed by a pointer of the home site, so the number of points that can be pointed to simultaneously is limited to the number of pointers of the home site.

With WebEx (http://www.webex.co.jp/), although the number of points to be pointed to can be increased or decreased according to the number of sites, a region that can be pointed to is limited to the shared window that is being shared between sites. For this reason, in an environment where there are multiple shared windows, pointing operations cannot be performed across those shared windows. In addition, because of the fact that this shared window is managed by a server and that pointing information regarding pointing operations is also distributed via the server to each site as information combined with window information regarding the shared window, response time increases.

Furthermore, in Japanese Patent Laid-Open No. 7-230357, although there is no problem in hiding the pointer for viewing of a window, such a hidden pointer may cause difficulties in use during actual operation.

SUMMARY OF THE INVENTION

The present invention provides an information processing apparatus that allows pointing operations to be performed simultaneously at multiple sides and across multiple windows without increasing the load on a server, a control method therefor, and a program.

According to the first aspect of the present invention, an information processing apparatus connected to a plurality of information processing apparatuses via a network and including an input apparatus inputs pointing information and a display output apparatus, the information processing apparatus comprising: a first display control unit adapted to control display of a pointer on a display screen of the display output apparatus in accordance with first pointing information obtained from the input apparatus; a reception unit adapted to receive, from an information processing apparatus at another site connected via the network, second pointing information obtained from an input apparatus of the information processing apparatus at the other site; and a second display control unit adapted to control display of the second pointing information received by the reception unit on the display screen of the display output apparatus, wherein the second display control unit displays a dedicated window for displaying the second pointing information in the foreground with respect to other windows displayed on the display screen.

According to the second aspect of the present invention, a control method for an information processing apparatus that is connected to a plurality of information processing apparatuses via a network and includes an input apparatus inputs pointing information and a display output apparatus, the control method comprising: a first display control step, performed by a first display control unit, of controlling display of a pointer on a display screen of the display output apparatus in accordance with first pointing information obtained from the input apparatus; a reception step, performed by a reception unit, of receiving, from an information processing apparatus at another site connected via the network, second pointing information obtained from an input apparatus of the information processing apparatus at the other site; and a second display control step, performed by a second display control unit, of controlling display of the second pointing information received in the reception step on the display screen of the display output apparatus, wherein, in the second display control step, a dedicated window for displaying the second pointing information is displayed in the foreground with respect to other windows displayed on the display screen.

According to the third aspect of the present invention, a program for causing a computer to control an information processing apparatus that is connected to a plurality of information processing apparatuses via a network and includes an input apparatus inputs pointing information and a display output apparatus, the program causing the computer to function as: a first display control unit adapted to control display of a pointer on a display screen of the display output apparatus in accordance with first pointing information obtained from the input apparatus; a reception unit adapted to receive, from an information processing apparatus at another site connected via the network, second pointing information obtained from an input apparatus of the information processing apparatus at the other site; and a second display control unit adapted to control display of the second pointing information received by the reception unit on the display screen of the display output apparatus, wherein the second display control unit displays a dedicated window for displaying the second pointing information in the foreground with respect to other windows displayed on the display screen.

According to the present invention, it is possible to provide an information processing apparatus that allows pointing operations to be performed simultaneously at multiple sides and across multiple windows without increasing the load on a server, a control method therefor, and a program.

Further features of the present invention will become apparent from the following description of exemplary embodiments with reference to the attached drawings.

BRIEF DESCRIPTION OF THE DRAWINGS

FIG. 8A is a diagram showing an example of controlling display on the display screen according to the third embodiment.

FIG. 8B is a diagram showing an example of controlling display on the display screen according to the third embodiment.

FIG. 8C a diagram showing an example of controlling display on the display screen according to the third embodiment.

FIG. 8D a diagram showing an example of controlling display on the display screen according to the third embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A description of a pointing display apparatus (information processing apparatus) according to a first embodiment takes the example of a pointing display apparatus that displays a pointer (e.g., a mouse pointer) of its own terminal in one window and displays a pointer of another terminal in another window.

Note that the term "pointing" as used in the present invention refers to, for example, various types of operations performed by a pointing device on a pointer displayed on a display output apparatus of the information processing apparatus, such as moving a pointer, clicking a pointer, and dragging-and-dropping a pointer.

Figure 1:
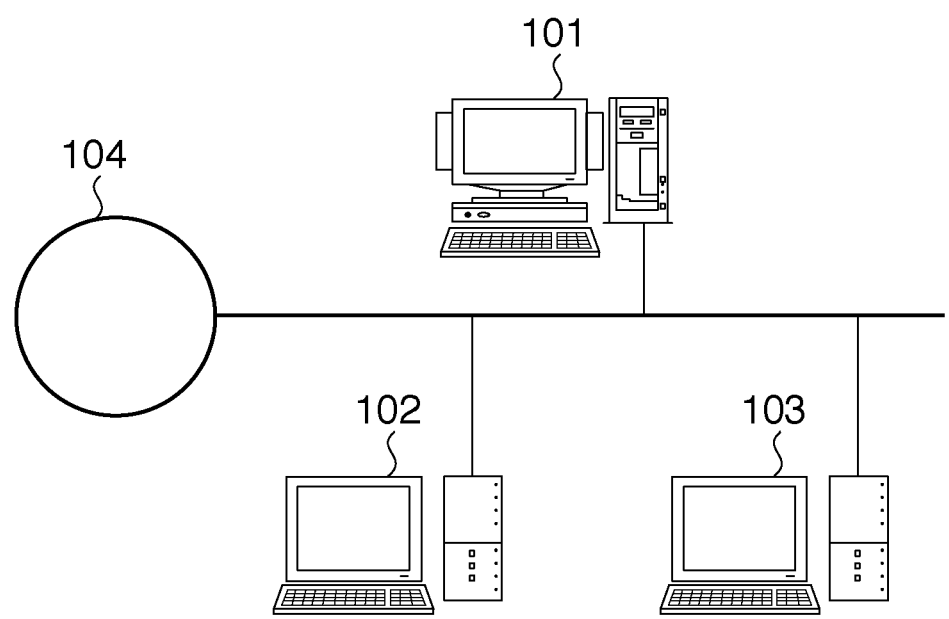
FIG. 1 is a diagram showing a network configuration of a pointing display apparatus according to a first embodiment.

FIG. 1 is a diagram showing an example of a network configuration of a screen sharing system according to the first embodiment.

Reference numerals 101 to 103 denote clients that function as pointing display apparatuses, and the clients 101 to 103 transmit and receive, among themselves, pointing information regarding pointing operations performed with their own pointer that they respectively control. Each of the clients 101 to 103 has a communication function therein and is connected to a network 104.

Figure 2A:
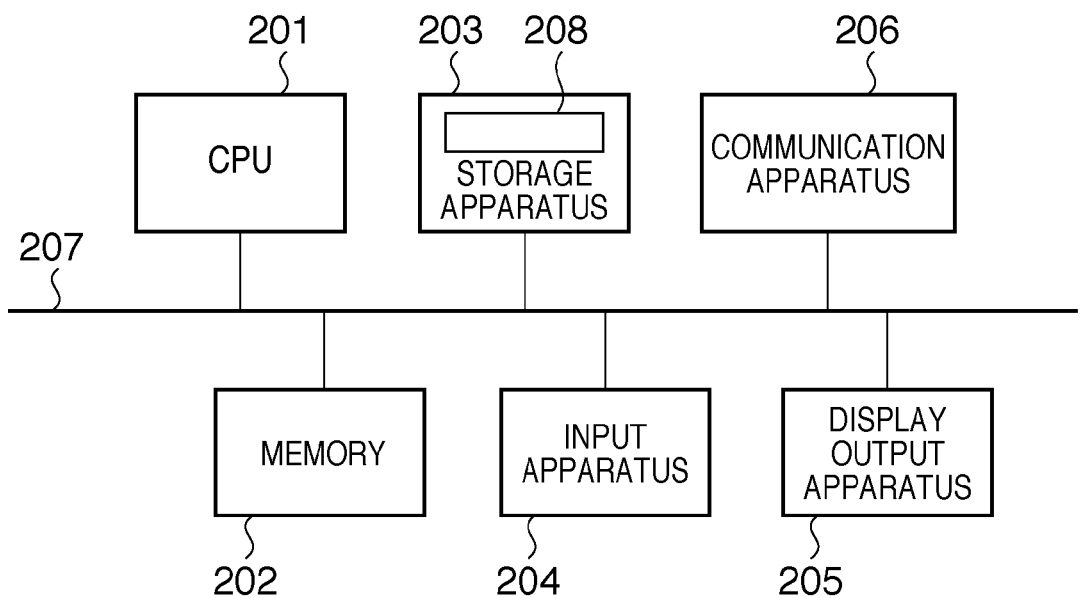
FIG. 2A is an internal configuration diagram of the pointing display apparatus of the first embodiment.

FIG. 2A is a diagram showing an internal configuration of a pointing display apparatus according to the first embodiment.

The client 101 serving as a pointing display apparatus includes a CPU 201, a memory 202, a storage apparatus 203, an input apparatus 204, a display output apparatus 205, and a communication apparatus 206, the constituent elements being connected to one another via a bus 207.

The CPU 201 performs various types of functions described later by executing a control program 208 such as an application program stored in the storage apparatus 203. The control program 208 is stored as part of data stored in the storage apparatus 203.

The memory 202 temporarily stores programs and data that have been read by the CPU 201 from the storage apparatus 203. The memory 202 is also used as an area for execution of various types of programs by the CPU 201.

The storage apparatus 203 stores, for example, an operating system (OS), various types of application programs, the control program 208, and data. One example of such data is pointing information (e.g., a coordinate value) regarding a pointing operation currently being performed with a pointer. Note that the storage apparatus 203 is configured by, for example, a large capacity storage apparatus such as a HDD.

The input apparatus 204 is a function unit that receives input from a user. Specifically, a digitizer, a pen, a mouse, or the like is used as the input apparatus 204. The display output apparatus 205 displays information received by the input apparatus 204 and execution results obtained by the CPU 201 executing application programs. The communication apparatus 206 is an apparatus for connecting to a network, and exchanges information such as pointing information between clients. The bus 207 interconnects those apparatuses and transfers data.

Figure 2B:
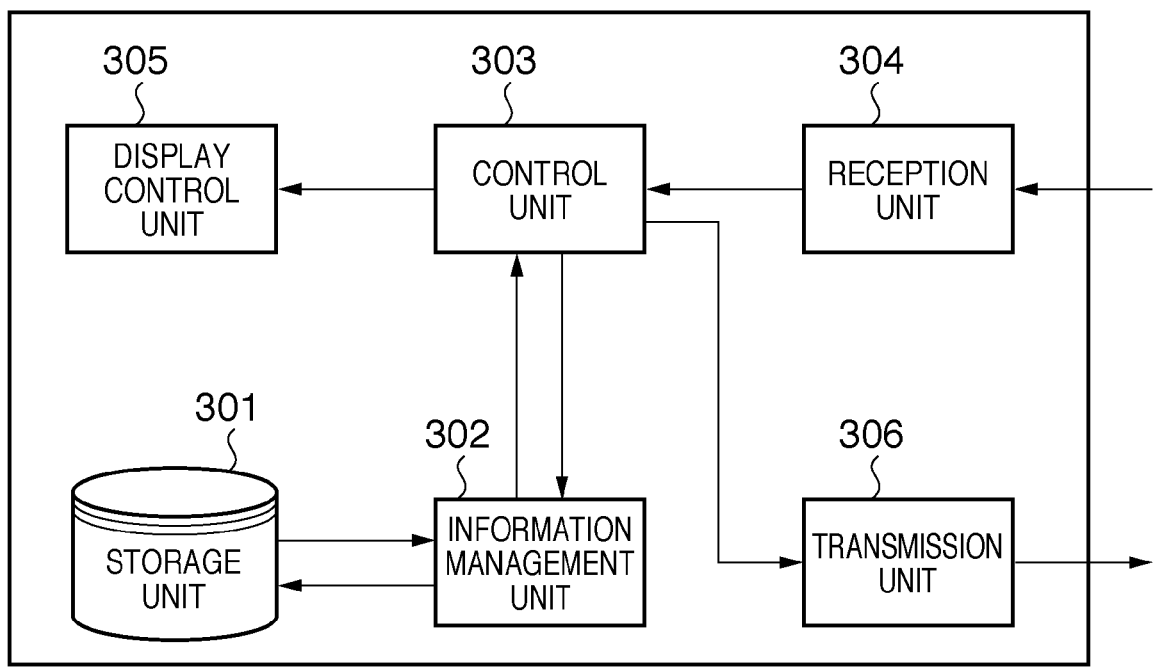
FIG. 2B is a functional block diagram of the pointing display apparatus of the first embodiment.

FIG. 2B is a functional block diagram of the pointing display apparatus according to the first embodiment.

The client 101 serving as a pointing display apparatus is constituted by functions units including a storage unit 301, an information management unit 302, a control unit 303, a reception unit 304, a display control unit 305, and a transmission unit 306.

The storage unit 301 stores information such as pointing information currently being displayed, in accordance with a request from the information management unit 302. Specifically, when the CPU 201 executes the control program 208, the storage unit 301 is allocated in the memory 202 and the storage apparatus 203.

The information management unit 302 manipulates and manages the information stored in the storage unit 301, and performs control and management of the storage unit 301 in accordance with a request from the control unit 303. Specifically, the information management unit 302 is implemented by the CPU 201 executing the control program 208.

The control unit 303 controls execution of various types of functions contained in the control program 208 in accordance with the information received by the reception unit 304. Note that the control unit 303 includes an internal timer and is thus capable of timing various types of operations.

The reception unit 304 receives, for example, information that has been input by a user through the input apparatus 204 and information transmitted from other clients, and notifies the control unit 303 of the received information. The display control unit 305 functioning as first and second display control units displays execution results obtained through various types of functions implemented by the control unit 303 based on the information received by the reception unit 304. Specifically, the display control unit 305 is constituted by the display output apparatus 205. The transmission unit 306 transmits the information stored in the storage unit 301 via the control unit 303 to outside the terminal.

Figure 3:
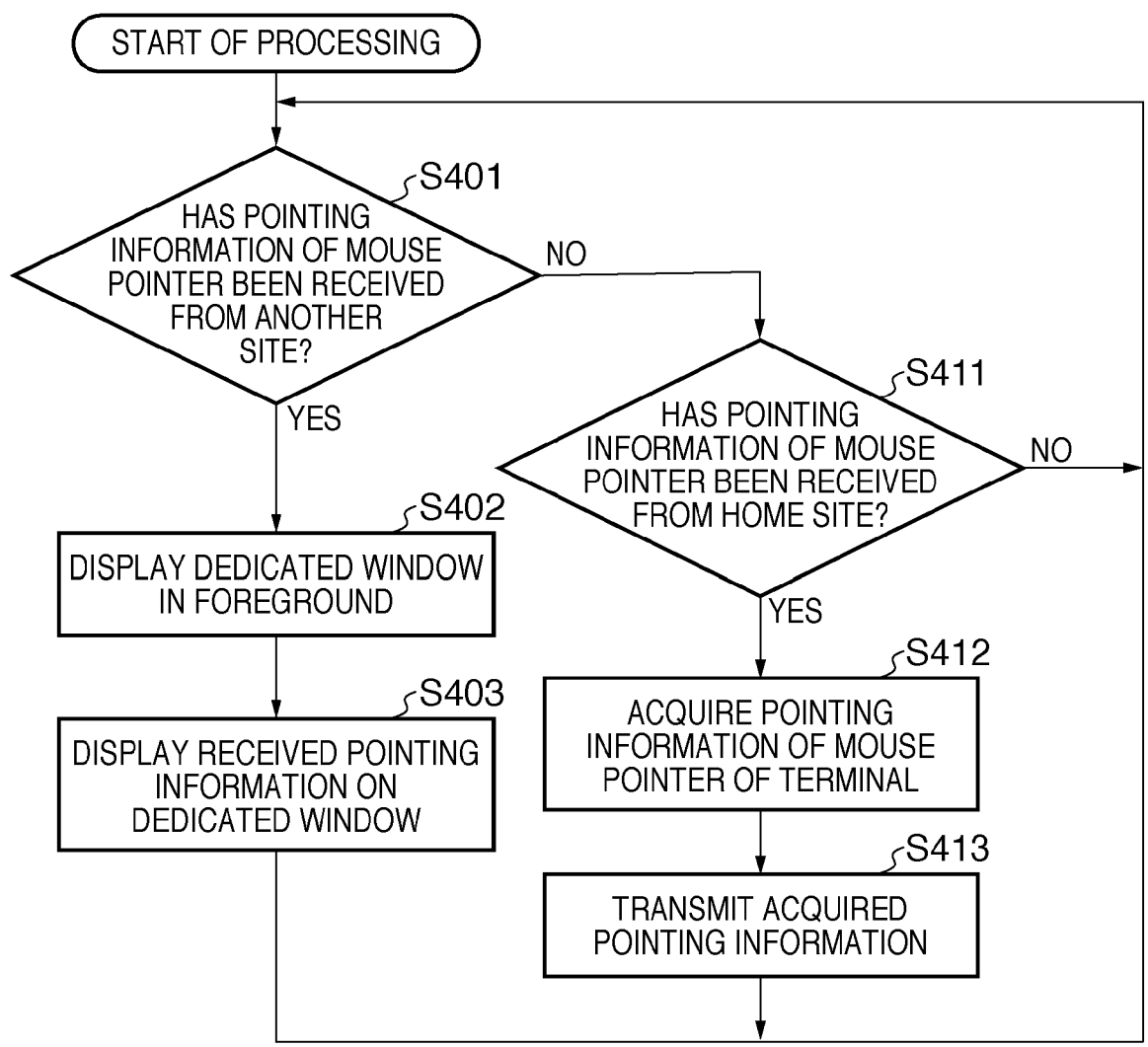
FIG. 3 is a flowchart of an operation performed by the pointing display apparatus of the first embodiment.

FIG. 3 is a flowchart of an operation performed by a pointing display apparatus according to the first embodiment.

In particular, FIG. 3 shows a flowchart of an operation in which the client 101 displays a point pointed to in a window displayed on the client 102 side. The following description is given with reference to an example of a display screen in each step of the operation procedure (FIGS. 4A and 4B).

Although the following description takes the example of a case where a mouse is primarily used as the input apparatus 204, the input apparatus 204 may be any pointing device such as a digitizer that is capable of inputting coordinates. It is assumed that the clients 101 and 102 are connected to each other via a network and can transmit information therebetween.

Figure 4A:
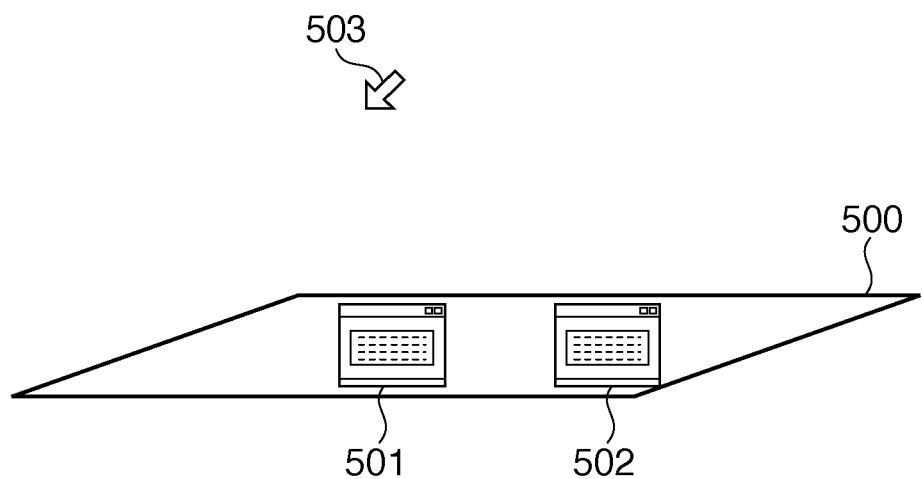
FIG. 4A is a diagram showing an example of controlling display on a display screen according to the first embodiment.
Figure 4B:
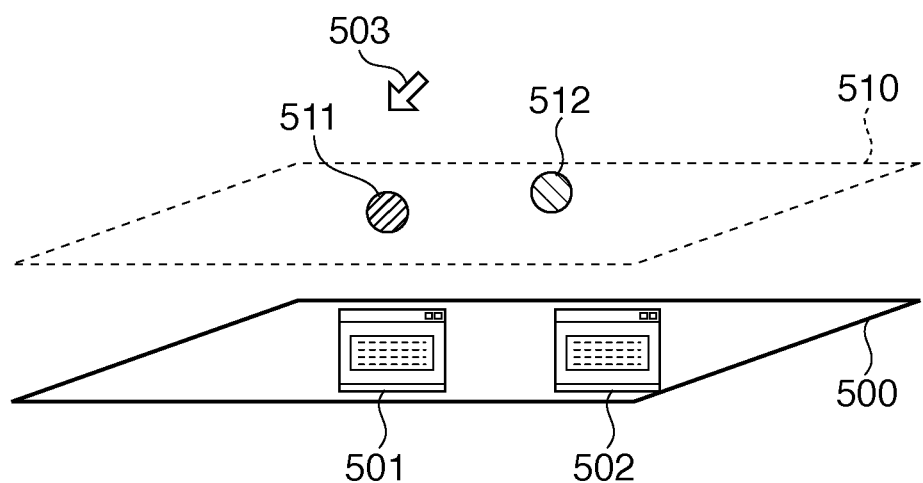
FIG. 4B is a diagram showing an example of controlling display on the display screen according to the first embodiment.

FIG. 4A is a diagram showing an exemplary pointing display screen of the client 101. Windows 501 and 502 of applications or the like are displayed on a display screen 500. Here, with a conventional configuration, a mouse pointer 503 of the client 101 is displayed with respect to the entire display screen 500.

In step S401, the control unit 303 determines whether or not the reception unit 304 has received pointing information of a mouse pointer transmitted from the transmission unit 306 of the client 102. If the pointing information has been received (YES in step S401), the processing proceeds to step S402. On the other hand, if the pointing information has not been received (NO in step S401), the processing proceeds to step S411.

Note that the pointing information includes coordinate information of the mouse pointer and client information (such as an IP address and a username) of a transmission source of the pointing information.

In step S402, the control unit 303 creates a dedicated window for displaying the pointing information of the mouse pointer received from the client 102, which is the other site, and displays the created window in the foreground. In step S403, an object targeted for display is displayed in the dedicated window based on the received pointing information. Specifically, the pointing information is displayed in another window (dedicated window) different from the window and the mouse pointer currently being displayed. It should be noted that this dedicated window is a transparent window so that other windows thereunder or a desktop area in the lowermost layer can be viewed. In other words, it can be said that the dedicated window is a transparent layer that appears in the foreground on the display screen in order to display pointing information.

FIG. 4B is a diagram showing an exemplary display screen of the client 101 in step S403. A dedicated window 510 for displaying the pointing information received from the client 102, which is the other site, is displayed in the foreground from the state of the display screen 500 shown in FIG. 4A. In the window 510 is displayed pointing information such as pointing information 511 received from the client 102 and pointing information 512 from another site.

Note that each piece of pointing information is displayed as an object (a circular image object in FIG. 4B) in a position corresponding to the coordinate information included in the pointing information in the dedicated window 510. The object may include a text object such as a character string, in addition to an image object.

On the other hand, if the pointing information has not been received, the control unit 303 determines in step S411 whether or not the reception unit 304 has detected pointing information of the mouse pointer received from the input apparatus 204 of the client 101. If the pointing information has been detected (YES in step S411), the processing proceeds to step S412. On the other hand, if the pointing information has not been detected (NO in step S411), the processing of step S401 or S411 is repeated until the pointing information is received or detected.

In step S412, the control unit 303 acquires the pointing information of the mouse pointer detected from the client 101. In step S413, the transmission unit 306 transmits the acquired pointing information of the mouse pointer to the client 102.

As described above, according to the first embodiment, only the pointing information is transmitted and received between terminals, and the pointing information received from terminals at other sites is displayed on another window different from the window used by the terminal at the home site, without using the pointer managed by the terminal at the home site for the display. With such a configuration, it is possible to receive pointing information simultaneously from multiple terminals. It is also possible to perform pointing operations spanning multiple windows.

More specifically, based on the pointing information transmitted from the transmission unit 306 of the client 102, the client 101 displays the pointing information using an object different from the window and the mouse pointer currently being displayed. This allows pointing operations spanning the window currently being displayed to be performed simultaneously at other sites without increasing the load on a server.

Figure 6A:
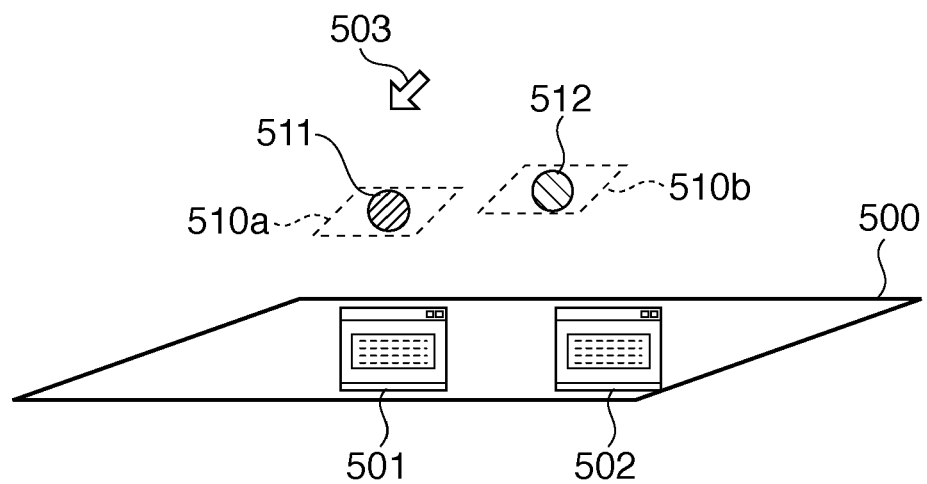
FIG. 6A is a diagram showing an example of controlling display on the display screen according to the second embodiment.

Note that the size of the dedicated window for displaying pointing information received from other sites may be the same as that of the window 510 that corresponds to the entire display screen as as shown in FIG. 4B. Alternatively, the size of the dedicated window may be the size of windows 510a and 510b enough to display the pointing information received from other sites as shown in FIG. 6A described in a second embodiment. In either case, there is no problem as long as the dedicated window is displayed in a window different from the window and the mouse pointer currently being displayed.

Second Embodiment

With the configuration of the first embodiment, display of the pointing information received from other sites allows the conditions at those sites to be known. However, for example, in the state shown in FIG. 4B, if the display of the window 501 on the display screen 500 at the home site is blocked by the display of the dedicated window 510, there are cases in which the window 501 cannot be operated. Thus, a configuration for dealing with such cases is described in the second embodiment. Note that the configuration of each pointing display apparatus is similar to that in the first embodiment, and therefore a description thereof has been omitted.

Figure 5:
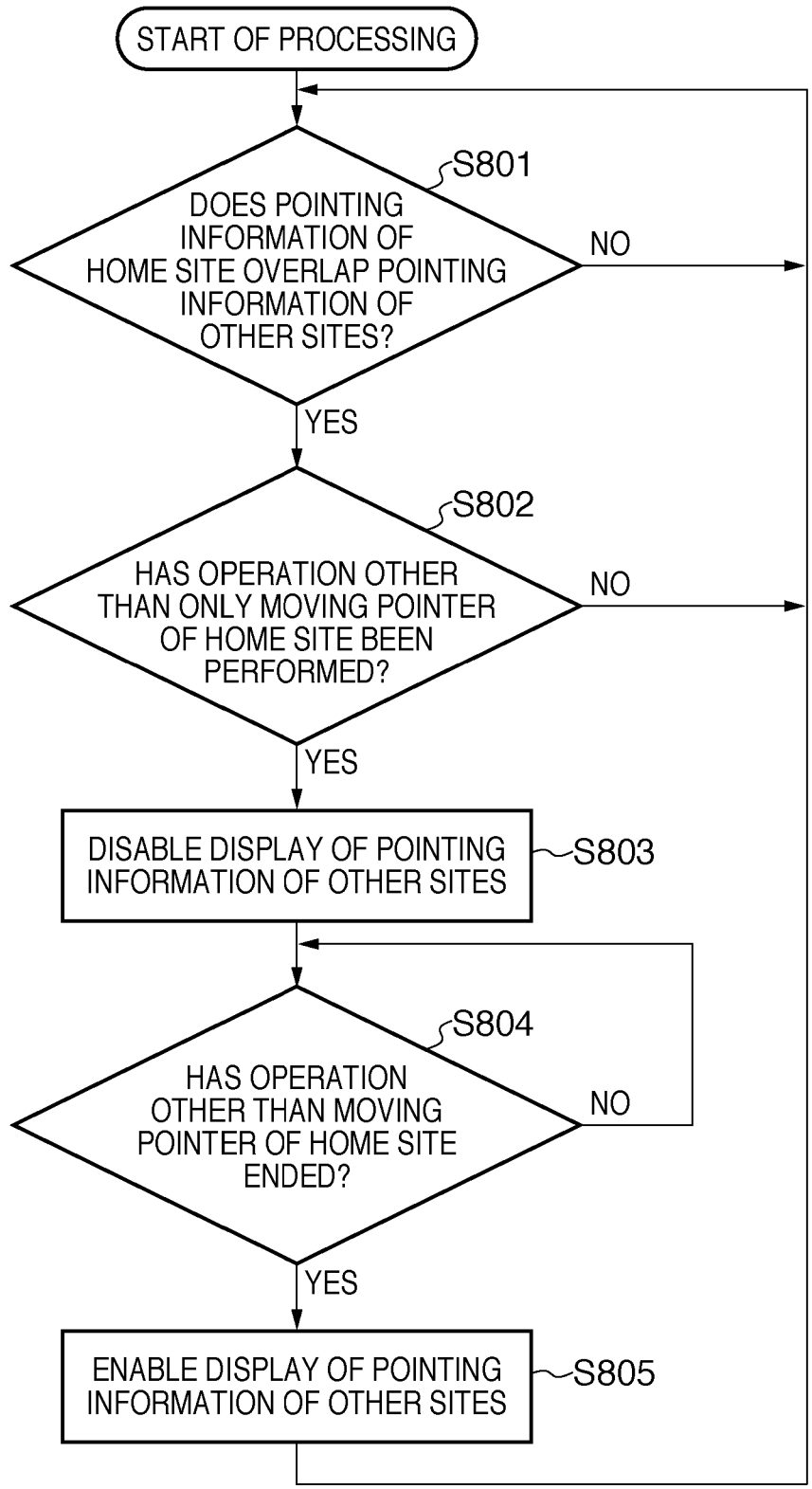
FIG. 5 is a flowchart of an operation performed by a pointing display apparatus according to a second embodiment.

FIG. 5 is a flowchart of an operation performed by a pointing display apparatus according to the second embodiment.

In particular, FIG. 5 shows processing performed in the case where the client 101 performs an operation other than only moving the mouse pointer over a point pointed to by the client 102. Note that the application display screen before the client 101 performs the operation is the same as in the first embodiment.

It should be noted that, in the second embodiment, a window for displaying the pointing information from other sites does not constitute the entire display screen 500 as in the case of the dedicated window 510 of the first embodiment shown in FIG. 4B. Instead, as shown in FIG. 6A, dedicated windows each having a size capable of displaying an object displayed as pointing information (a size including the smallest circumscribed rectangle of an object), such as the pointing windows 510a and 510b, are displayed on the display screen 500.

Specifically, in FIG. 6A, the pointing window 510a for displaying pointing information 511 of the client 102 is displayed immediately under the mouse pointer 503 of the client 101. Furthermore, the window 501 used by the client 101 is displayed under the window 510a on the display screen 500. In a case where the client 101 performs an operation associated with a click or an operation such as drag-and-drop on the window 501 under these conditions, this operation is absorbed in the pointing window 510a with the configuration of the first embodiment. The window 501 thus cannot be operated. In view of this, the following processing is performed in the second embodiment.

In step S801, the control unit 303 determines whether or not the pointing information (first pointing information) of the home site overlaps the pointing information (second pointing information) of other sites. If they overlap (YES in step S801), the processing proceeds to step S802. On the other hand, if they do not overlap (NO in step S801), this step is repeated until an overlap is detected.

Note that, in the case of FIG. 6A, it is determined whether or not the mouse pointer 503 of the client 101 overlaps at least part of the pointing information (or the pointing window 510a for displaying the pointing information) received from the client 102. It is also possible to determine the proportion by which they overlap, that is, whether they overlap partly or overlay completely or overlap in a predetermined proportion, and the function of the OS installed on the client may be used for the method of determination.

In step S802, the control unit 303 determines whether or not an operation other than only moving the pointer of the home site has been performed. If such an operation has been performed (YES in step S802), the processing proceeds to step S803. On the other hand, if such an operation has not been performed (NO in step S802), the processing returns to step S801.

Note that the function of the OS installed in the client can also be used for this purpose of monitoring the operation of the pointer of the home site and determining or detecting whether or not an operation other than only moving the pointer has been performed.

In step S803, the control unit 303 disables display of the pointing information at other sites. In the case of FIG. 6A, for example, the pointing window 510a is hidden.

Figure 6B:
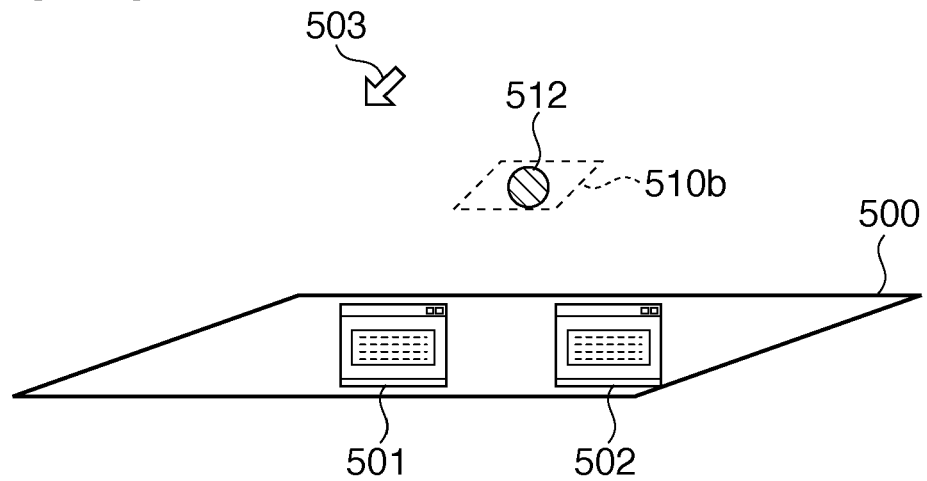
FIG. 6B is a diagram showing an example of controlling display on the display screen according to the second embodiment.

FIG. 6B is a diagram showing a pointing display screen of the client 101 immediately after execution of step S803. Since the pointing window 510a blocking the operation of the mouse pointer 503 of the client 101 is hidden, the window 501 immediately thereunder can be operated. In the case of the configuration of the first embodiment shown in FIG. 4B, this is equivalent to performing disabling processing such as hiding the entire dedicated window 510 for displaying the pointing information.

In step S804, the control unit 303 determines whether or not the operation detected in step S802 has ended. If the end of the operation has been detected (YES in step S804), the processing proceeds to step S805. In step S805, the control unit 303 again enables the display of the pointing information at other sites, which has been disabled in step S803. On the other hand, if the end of the operation has not been detected (NO in step S804), the processing returns to step S804.

As described above, according to the second embodiment, in the case where the mouse pointer of the home site is operated in a state in which the mouse pointer of the home site overlaps the pointing window of another site, the display of that pointing window is hidden temporarily (for a predetermined period of time). This allows the window of the home site to be directly operated by the mouse pointer of the home site.

In the case of FIG. 6B, if the mouse pointer 503 is operated in a state in which the mouse pointer 503 of the client 101 overlaps the pointing window 510a of the client 102, the display of the pointing window 510a is temporarily hidden. This allows the window 501 to be directly operated using the mouse pointer 503.

Note that the description of the second embodiment takes the example of the case where an operation starts when the mouse pointer of the home site overlaps the display of the pointing information at other sites. However, the present embodiment is also similarly applicable to other cases, such as the case of a drag-and-drop operation where the dropped position overlaps the pointing window of another site during or after the end of the operation.

Third Embodiment

In a third embodiment, a description is given of an application example of processing in the case of operating a mouse pointer of the home site when the mouse pointer of the home site overlaps the display of pointing information at another site. Specifically, blocking of the operation of the mouse pointer of the home site is prevented by changing the shape of a pointing window for displaying the pointing information of another site. Note that the configuration of each pointing display apparatus is the same as in the first embodiment, and therefore a description thereof has been omitted.

Figure 7:
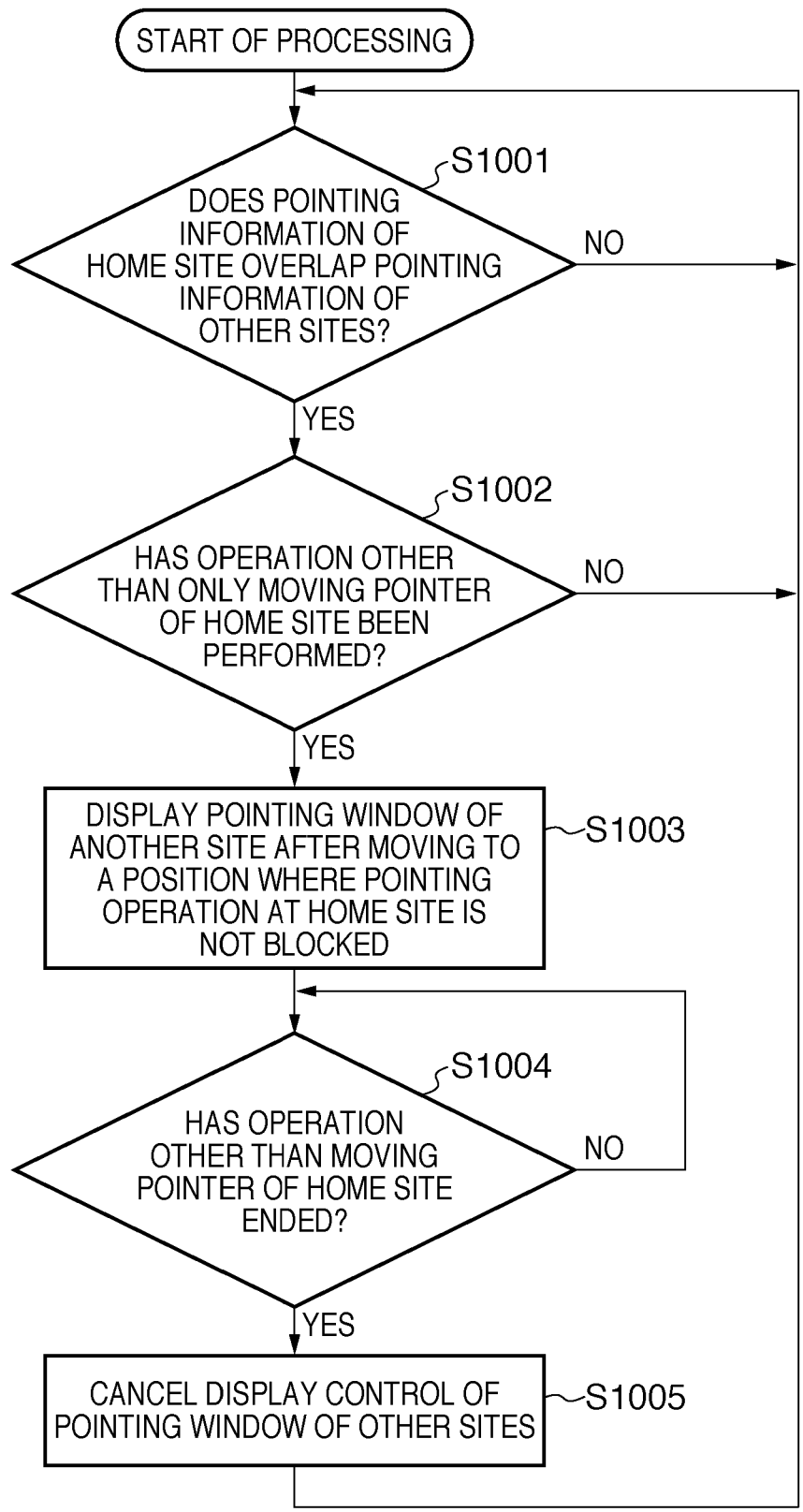
FIG. 7 is a flowchart of an operation performed by a pointing display apparatus according to a third embodiment.

FIG. 7 is a flowchart of the operation performed by a pointing display apparatus according to the third embodiment.

In particular, FIG. 7 shows processing performed in the case where the client 101 performs an operation other than only moving the mouse pointer on a point pointed by the client 102. Note that it is assumed in the following description that the application display screen before execution of the operation of the client 101 is the same as in the first embodiment.

Steps S1001 and S1002 are the same as steps S801 and S802 of FIG. 5 described in the second embodiment, and therefore descriptions thereof have been omitted.

In step S1003, the control unit 303 controls display of a pointing window 510a of the client 102 such that the operation of the mouse pointer 503 is not blocked. For example, the position of the pointing window 510a is moved in accordance with the operation of the mouse pointer 503 so that the operation performed on an object (the window 501) under the pointing window 510a is not blocked.

FIG. 8A shows a state immediately before execution of the processing of step S1003. The mouse pointer 503 of the client 101 overlaps the pointing window 510a of the client 102. In this case, operating the mouse pointer 503 results in the pointing window 510a being operated. If another window exists under the pointing window 510a, that window cannot be operated.

In view of this, processing for moving the mouse pointer 503 is performed in step S1003. It should be noted that control of the display of a pointing window is not limited thereto as long as the operation of the mouse pointer 503 is not blocked.

For example, in FIG. 8B, a hole is formed in part of the pointing window 510a so that the operation of the mouse pointer 503 passes through the pointing window 510a. In FIG. 8C, the size of the pointing window 510a is changed. In FIG. 8D, the pointing window 510a is moved and changed in shape so as to point to the same position.

Step S1004 is the same as step S804 of FIG. 5, and therefore a description thereof has been omitted.

In step S1005, the control unit 303 cancels the display control applied on the pointing window.

As described above, according to the third embodiment, in the case where the mouse pointer of the home site is operated in a state in which the mouse pointer of the home site overlaps a pointing window of another site, display control applied on the pointing information is temporarily changed. This allows the application window of the home site to be directly operated by the mouse pointer of the home site.

Specifically, by changing the shape of an object (or a pointing window) indicating the pointing information of terminals at other sites, normal operations can be achieved without blocking pointing operations of the terminal at the home site. In other words, this change in shape is equivalent to changing the shape of an object indicating the pointing information of terminals at other sites such that the pointer of the terminal at the home site does not overlap the object indicating the pointing information.

In the case of FIGS. 8A to 8D, if the mouse pointer 503 of the client 101 is operated in a state in which the mouse pointer 503 overlaps the pointing window 510a of the client 102, the pointing window 510a is changed in shape temporarily (for a predetermined period of time). This allows the window 501 to be directly operated as usual using the mouse pointer 503.

Fourth Embodiment

In the configurations of the second and third embodiments, subsequent processing is not performed until the end of the operation of the client 101, but the present invention is not intended to be limited thereto. For example, there is no problem even if the processing proceeds to the step of, for example, cancelling disabling immediately after the operation of an original target has started (for example, immediately after the selection of an application window has been confirmed).

Fifth Embodiment

A multi-window system can adopt any combination of the above-described embodiments without depending on the OS. For example, any combination of the above-described embodiments is applicable to a window system used in a PC such as Windows (registered trademark) or Linux (registered trademark) or to a portable terminal without problems.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-146890, filed on Jun. 28, 2010, which is hereby incorporated by reference herein in its entirety.

What is claimed is:

1. An information processing apparatus connected to a plurality of information processing apparatuses via a network and including an input apparatus which inputs pointing information and a display output apparatus, said information processing apparatus comprising:

a first display control unit adapted to control display of a pointer on a display screen of the display output apparatus in accordance with first pointing information obtained from the input apparatus;

a reception unit adapted to receive, from at least two of the plurality of information processing apparatuses connected via the network, second pointing information indicating coordinate information obtained from input apparatuses of the at least two of the plurality of information processing apparatuses;

a second display control unit adapted to control display of an object, which is different from the pointer, corresponding to the second pointing information received by said reception unit in a position corresponding to the coordinate information indicated by the second pointing information on the display screen of the display output apparatus;

a determination unit adapted to determine whether or not the pointer overlaps at least part of the object corresponding to the second pointing information; and a monitor unit adapted to monitor an operation of the pointer, wherein said second display control unit displays a dedicated window for displaying the object corresponding to the second pointing information in the foreground with respect to other windows displayed on the display screen, and wherein, in a case where said determination unit determines that the pointer overlaps at least part of the object corresponding to the second pointing information and said monitor unit detects that an operation other than moving the pointer is being performed, said second display control unit disables display of the dedicated window.

2. The information processing apparatus according to claim 1, wherein the dedicated window is a window that is displayed on the entire display screen.

3. The information processing apparatus according to claim 1, further comprising a third display control unit adapted to control display of an object, which is different from the pointer, corresponding to the second pointing information received by said reception unit in a position corresponding to the coordinate information indicated by the second pointing information on the display screen of the display output apparatus,
wherein said third display control unit displays a plurality of dedicated windows for displaying the object corresponding to the second pointing information in the foreground with respect to other windows displayed on the display screen, and
wherein each of the plurality of dedicated windows is a window having a size capable of displaying at least a smallest circumscribed rectangle of the object corresponding to the second pointing information.

4. The information processing apparatus according to claim 1, wherein said second display control unit enables display of the dedicated window from a state in which display of the dedicated window is disabled, in a case where said monitor unit detects that the operation other than only moving the pointer is not being performed.

5. The information processing apparatus according to claim 1, wherein said second display control unit enables display of the dedicated window from a state in which display of the dedicated window is disabled, immediately after said monitor unit detects that the pointer has started an operation on an operation target.

6. The information processing apparatus according to claim 1, further comprising:
a determination unit adapted to determine whether or not the pointer overlaps at least part of the second pointing information; and
a monitor unit adapted to monitor an operation of the pointer,
wherein, in a case where said determination unit determines that the pointer overlaps at least part of the second pointing information and said monitor unit detects that an operation other than only moving the pointer is being performed, said second display control unit changes a shape of the object corresponding to the second pointing information which is displayed in the dedicated window, such that the object does not overlap the pointer.

7. A control method for an information processing apparatus that is connected to a plurality of information processing apparatuses via a network and includes an input apparatus which inputs pointing information and a display output apparatus, the control method comprising:
a first display control step, performed by a first display control unit, of controlling display of a pointer on a display screen of the display output apparatus in accordance with first pointing information obtained from the input apparatus;
a reception step, performed by a reception unit, of receiving, from at least two of the plurality of information processing apparatuses connected via the network, second pointing information indicating coordinate information obtained from input apparatuses of the at least two of the plurality of information processing apparatuses;
a second display control step, performed by a second display control unit, of controlling display of an object, which is different from the pointer, corresponding to the second pointing information received in said reception step in a position corresponding to the coordinate information indicated by the second pointing information on the display screen of the display output apparatus;
a determination step, performed by a determination step unit adapted, of determining whether or not the pointer overlaps at least part of the object corresponding to the second pointing information; and
a monitor step, performed by a monitor unit, of monitoring an operation of the pointer,
wherein, in said second display control step, a dedicated window for displaying the object corresponding to the second pointing information is displayed in the foreground with respect to other windows displayed on the display screen, and
wherein, in a case where said determination step determines that the pointer overlaps at least part of the object corresponding to the second pointing information and said monitor step detects that an operation other than moving the pointer is being performed, said second display control step disables display of the dedicated window.

8. A non-transitory, computer-readable storage medium storing an executable program for causing a computer to control an information processing apparatus that is connected to a plurality of information processing apparatuses via a network and includes an input apparatus which inputs pointing information and a display output apparatus, the program causing the computer to function as:
a first display control unit adapted to control display of a pointer on a display screen of the display output apparatus in accordance with first pointing information obtained from the input apparatus;
a reception unit adapted to receive, from at least two of the plurality of information processing apparatuses connected via the network, second pointing information indicating coordinate information obtained from input apparatuses of the at least two of the plurality of information processing apparatuses;
a second display control unit adapted to control display of an object, which is different from the pointer, corresponding to the second pointing information received by said reception unit in a position corresponding to the coordinate information indicated by the second pointing information on the display screen of the display output apparatus;
a determination unit adapted to determine whether or not the pointer overlaps at least part of the object corresponding to the second pointing information; and
a monitor unit adapted to monitor an operation of the pointer,
wherein said second display control unit displays a dedicated window for displaying the object corresponding to the second pointing information in the foreground with respect to other windows displayed on the display screen, and
wherein, in a case where said determination unit determines that the pointer overlaps at least part of the object corresponding to the second pointing information and said monitor unit detects that an operation other than moving the pointer is being performed, said second display control unit disables display of the dedicated window.

* * * * *